United States Patent
Tam et al.

(10) Patent No.: US 11,764,882 B1
(45) Date of Patent: Sep. 19, 2023

(54) PRE-CONDITIONAL CALIBRATION FOR THIRD ORDER INTERMODULATION DISTORTION (IMD3) CANCELLATION

(71) Applicant: NXP USA, Inc., Austin, TX (US)

(72) Inventors: Sai-Wang Tam, Sunnyvale, CA (US);
Alden C. Wong, Sunnyvale, CA (US);
Weiwei Xu, Cupertino, CA (US); Yui Lin, Palo Alto, CA (US); Jue Yu, Cupertino, CA (US); Sridhar Reddy Narravula, Cupertino, CA (US); Dipen Bakul Parikh, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/839,187

(22) Filed: Jun. 13, 2022

(51) Int. Cl.
*H04B 17/12* (2015.01)
*H04B 1/7107* (2011.01)
*H04B 17/16* (2015.01)

(52) U.S. Cl.
CPC .......... *H04B 17/12* (2015.01); *H04B 1/7107* (2013.01); *H04B 17/16* (2015.01)

(58) Field of Classification Search
CPC ....... H04B 17/12; H04B 1/7107; H04B 17/16
See application file for complete search history.

(56) References Cited

U.S. PATENT DOCUMENTS

| | | | | |
|---|---|---|---|---|
| 2005/0242877 A1* | 11/2005 | Kusunoki | ............. | H03F 1/3223 330/149 |
| 2010/0060356 A1* | 3/2010 | Suzuki | ................... | H03F 1/3258 330/149 |
| 2016/0099733 A1* | 4/2016 | Weissman | ............. | H03F 1/3223 455/114.2 |
| 2019/0058497 A1* | 2/2019 | Matsuura | ................ | H04L 25/02 |
| 2021/0211209 A1* | 7/2021 | Kao | ..................... | H04B 17/104 |

FOREIGN PATENT DOCUMENTS

EP    3985888 A1 *   4/2022   ............. H04B 17/12

OTHER PUBLICATIONS

Machine Translation of JP-2004032584-A. (Year: 2023).*
Machine Translation of CN-107454994-B. (Year: 2023).*
Raghavan, A. et al. "Analysis and design of an interference canceller for collocated radios," in IEEE Transactions on Microwave Theory and Techniques, vol. 53, No. 11, Nov. 2005, pp. 3498-3508.

(Continued)

*Primary Examiner* — Jean B Corrielus

(57) ABSTRACT

Embodiments of a calibration system for third order intermodulation distortion (IMD3) cancellation and a wireless apparatus are disclosed. In an embodiment, a calibration system for IMD3 cancellation includes a cancellation circuit for IMD3 cancellation between a first transmitter and a second transmitter, and a controller coupled to the cancellation circuit and configured to for each frequency channel of the first transmitter, perform a pre-conditional calibration of the cancellation circuit, after the pre-conditional calibration, determine a phase configuration for the cancellation circuit, and after the phase configuration for the cancellation circuit is determined, determine an attenuation configuration for the cancellation circuit.

20 Claims, 7 Drawing Sheets

(56) References Cited

OTHER PUBLICATIONS

Katz, A. et al. "Sensitivity and mitigation of Reverse IMD in power amplifiers," 2011 IEEE Topical Conference on Power Amplifiers for Wireless and Radio Applications, Phoenix, AZ, (2011), pp. 53-56.
Ahmed, S. et al. "Mitigation of Reverse Intermodulation Products at Colocated Base Stations," in IEEE Transactions an Circuits and Systems I: Regular Papers, vol. 60, No. 6, Jun. 2013, pp. 1608-1620.
Zhang, T. et al. "Wideband Dual-Injection Path Self-Interference Cancellation Architecture for Full-Duplex Transceivers," in IEEE Journal of Solid-State Circuits, vol. 53, No. 6, Jun. 2018, pp. 1563-1576.

* cited by examiner

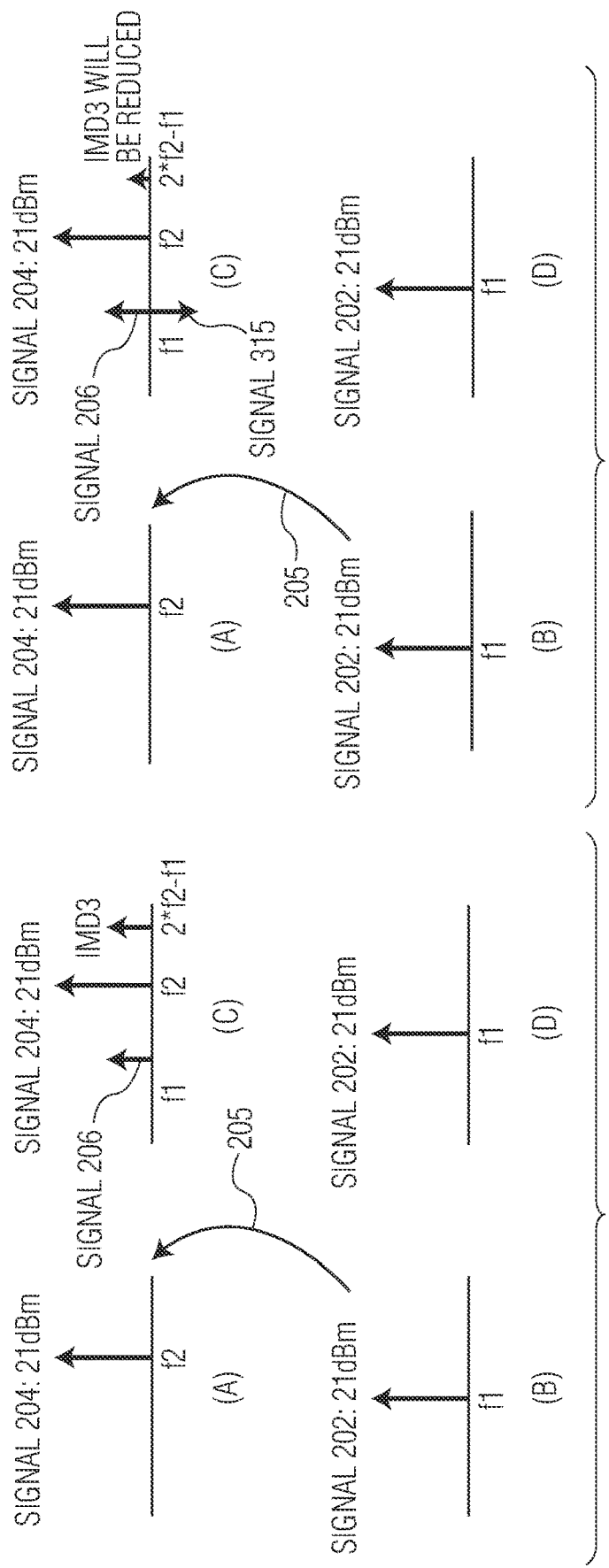

PRE-CONDITIONAL CALIBRATION FOR THIRD ORDER INTERMODULATION DISTORTION (IMD3) CANCELLATION

BACKGROUND

When two transmitters are simultaneously transmitting, cross coupling between the two transmitters may lead to third order intermodulation distortion (IMD3). Such modulation may occur when both transmitters are on the same integrated circuit or chip or when both transmitters are in close proximity. The cross coupling between two transmitters may occur due to finite coupling between the two transmitters via the antennas, packaging, printed circuit board routing, or on chip routing. Each transmitted signal may be cross coupled into one another at their power amplifier (PA) output. The large PA output and the coupled tone can create an IMD3 tone. At times, these IMD3 tones may be large enough to violate regulations limiting such transmissions. For example, the Federal Communications Commission (FCC) has set a limit of −41 dBm/MHz for such signals. This problem increases as both transmitters transmit high power signals at the same time.

SUMMARY

Embodiments of a calibration system for third order intermodulation distortion (IMD3) cancellation and a wireless apparatus are disclosed. In an embodiment, a calibration system for IMD3 cancellation includes a cancellation circuit for IMD3 cancellation between a first transmitter and a second transmitter, and a controller coupled to the cancellation circuit and configured to for each frequency channel of the first transmitter, perform a pre-conditional calibration of the cancellation circuit, after the pre-conditional calibration, determine a phase configuration for the cancellation circuit, and after the phase configuration for the cancellation circuit is determined, determine an attenuation configuration for the cancellation circuit. Other embodiments are also described.

In an embodiment, the controller is further configured to turn off a phase interpolator and an auxiliary amplifier of the cancellation circuit and turn on a mixer, a power amplifier driver, and a power amplifier of the second transmitter.

In an embodiment, the controller is further configured to measure a power value at an output of a power amplifier of the second transmitter while the phase interpolator and the auxiliary amplifier of the cancellation circuit are turned off and the mixer, the power amplifier driver, and the power amplifier of the second transmitter are turned on.

In an embodiment, the controller is further configured to, for each frequency channel of the first transmitter, configure the phase interpolator of the cancellation circuit and the auxiliary amplifier of the cancellation circuit based on the power value at the output of the power amplifier of the second transmitter.

In an embodiment, the controller is further configured to, for each frequency channel of the first transmitter, configure a bias setting and an attenuation setting of the phase interpolator and a bias setting of the auxiliary amplifier of the cancellation circuit based on the power value at the output of the power amplifier of the second transmitter.

In an embodiment, the controller is further configured to, for each frequency channel of the first transmitter, configure the bias setting and the attenuation setting of the phase interpolator and the bias setting of the auxiliary amplifier of the cancellation circuit based on a look-up table that contains the power value at the output of the power amplifier of the second transmitter.

In an embodiment, the controller is further configured to determine a phase quadrant for the cancellation circuit and determine a phase setting within the phase quadrant for the cancellation circuit.

In an embodiment, the controller is further configured to select a phase quadrant for the cancellation circuit that corresponds to a lowest power value at an output of a power amplifier of the second transmitter and determine a phase setting within the phase quadrant for the cancellation circuit that corresponds to a lowest power value at the output of the power amplifier of the second transmitter.

In an embodiment, the controller is further configured to configure a mixer and a power amplifier driver of the second transmitter.

In an embodiment, the controller is further configured to after the phase configuration for the cancellation circuit is determined, determine a capacitor divider value for an attenuator of the cancellation circuit.

In an embodiment, the cancellation circuit includes an attenuator configured to attenuate a transmitted signal from the first transmitter, an I/Q demodulator configured to split an attenuated signal into in-phase (I) and quadrature signals (Q), a phase interpolator configured to apply a calibration phase shift and a calibration attenuation to the I and Q signals and to recombine the I and Q signals, an auxiliary balun coupled to an output of the phase interpolator, and an auxiliary power amplifier with an input connected to the auxiliary balun configured to generate a cancellation signal, wherein an output of the auxiliary power amplifier is connected to an output of the second transmitter.

In an embodiment, the cancellation circuit further includes routing lines connecting the phase interpolator to the auxiliary balun.

In an embodiment, a calibration system for IMD3 cancellation includes a cancellation circuit for IMD3 cancellation between a first wireless transmitter and a second wireless transmitter and a controller coupled to the cancellation circuit and configured to, for each frequency channel of the first wireless transmitter, perform a pre-conditional calibration of the cancellation circuit by measuring a power value at an output of a power amplifier of the second wireless transmitter while a phase interpolator and an auxiliary amplifier of the cancellation circuit are turned off and a mixer, a power amplifier driver, and the power amplifier of the second wireless transmitter are turned on, after the pre-conditional calibration, determine a phase configuration for the phase interpolator, and after the phase configuration for the phase interpolator is determined, determine an attenuation configuration for the cancellation circuit.

In an embodiment, the controller is further configured to, for each frequency channel of the first wireless transmitter, configure a bias setting and an attenuation setting of the phase interpolator of the cancellation circuit and a bias setting of the auxiliary amplifier of the cancellation circuit based on a look-up table that contains the power value at the output of the power amplifier of the second wireless transmitter.

In an embodiment, the controller is further configured to determine a phase quadrant for the cancellation circuit and determine a phase setting within the phase quadrant for the cancellation circuit.

In an embodiment, the controller is further configured to select a phase quadrant for the cancellation circuit that corresponds to a lowest power value at the output of the power amplifier of the second wireless transmitter, and determine a phase setting within the phase quadrant for the cancellation circuit that corresponds to a lowest power value at the output of the power amplifier of the second wireless transmitter.

In an embodiment, the controller is further configured to after the phase configuration for the phase interpolator is determined, determine a capacitor divider value for an attenuator of the cancellation circuit.

In an embodiment, the cancellation circuit includes an attenuator configured to attenuate a transmitted signal from the first wireless transmitter, an I/Q demodulator configured to split an attenuated signal into in-phase (I) and quadrature signals (Q), a phase interpolator configured to apply a calibration phase shift and a calibration attenuation to the I and Q signals and to recombine the I and Q signals, an auxiliary balun coupled to an output of the phase interpolator, and an auxiliary power amplifier with an input connected to the auxiliary balun configured to generate a cancellation signal, wherein an output of the auxiliary power amplifier is connected to an output of the second wireless transmitter.

In an embodiment, the cancellation circuit further includes routing lines connecting the phase interpolator to the auxiliary balun.

In an embodiment, a wireless apparatus includes a first wireless transmitter, a second wireless transmitter, and a calibration system for IMD3 cancellation. The calibration system includes a cancellation circuit for IMD3 cancellation between the first wireless transmitter and the second wireless transmitter, and a controller coupled to the cancellation circuit and configured to, for each frequency channel of the first wireless transmitter, perform a pre-conditional calibration of the cancellation circuit, after the pre-conditional calibration, determine a phase configuration for the cancellation circuit, and after the phase configuration for the cancellation circuit is determined, determine an attenuation configuration for the cancellation circuit.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 2 illustrates example frequency plots of signals transmitted by power amplifiers of an aggressor and a victim of the wireless system depicted in FIG. 1 without signal cancellation.

FIG. 3 illustrates the addition of a cancellation signal that is generated by a cancellation circuit at the output of the power amplifier PA of the victim of the wireless system depicted in FIG. 1.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
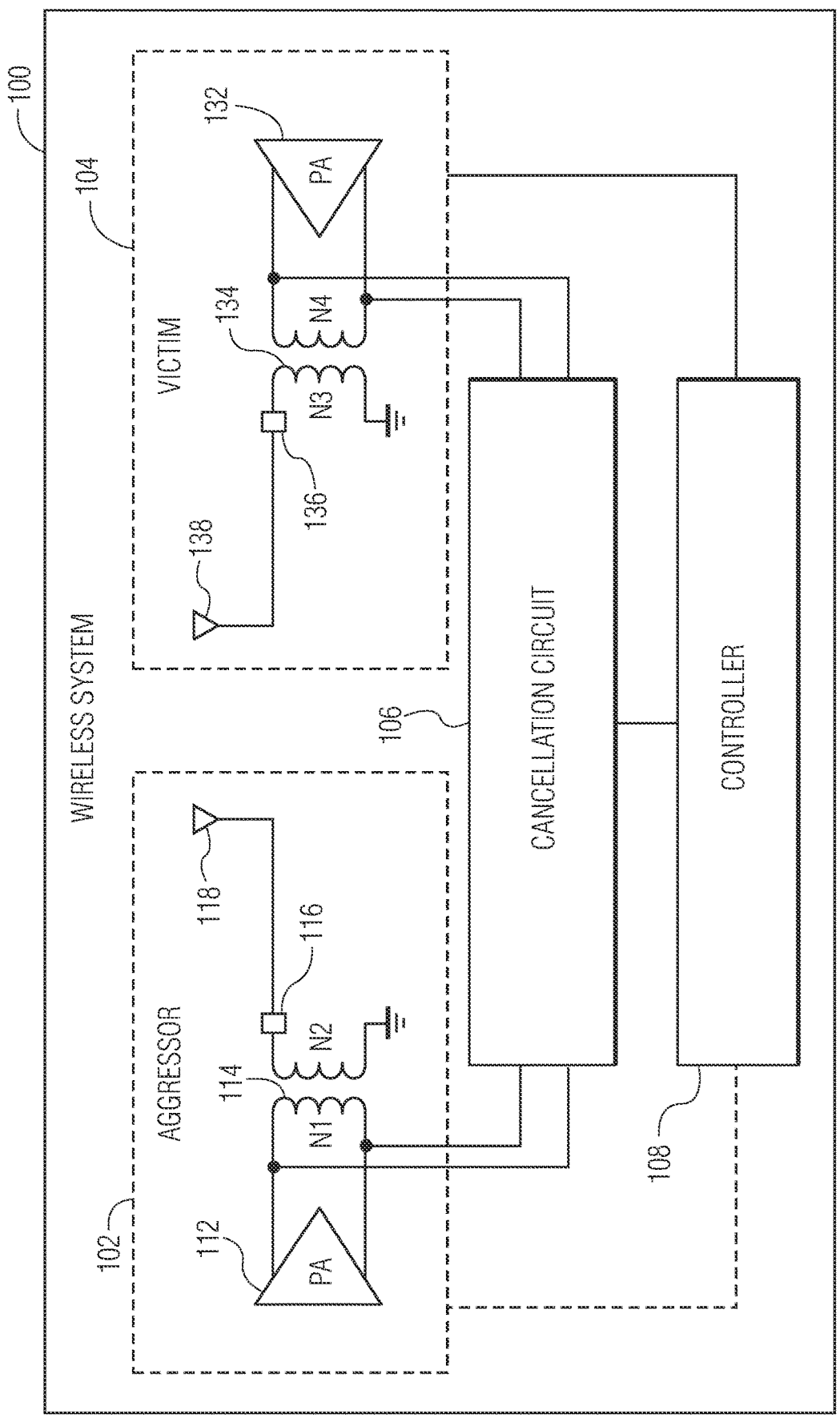
FIG. 1 is a schematic block diagram of a wireless system in accordance with an embodiment of the invention.

FIG. 1 is a schematic block diagram of a wireless system 100 in accordance with an embodiment of the invention. The wireless system can simultaneously transmit wireless signals through multiple antennas. The wireless system can be used in various applications, such as automotive applications, communications applications, industrial applications, medical applications, computer applications, and/or consumer or appliance applications. In the embodiment depicted in FIG. 1, the wireless system includes an aggressor 102, a victim 104, a cancellation circuit 106, and a controller 108. In some embodiments, the wireless system 100 is implemented in a substrate, such as a semiconductor wafer. In an embodiment, the wireless system 100 or a component of the wireless system is packaged as a stand-alone integrated circuit (IC) chip. For example, the aggressor 102 and the victim 104 are located on the same IC chip. In some embodiments, the aggressor 102 and the victim 104 are located in close proximity but in different IC chips. Although the wireless system is shown in FIG. 1 as including certain circuit elements, in other embodiments, the wireless system may include one or more additional circuit elements. For example, the wireless system may include one or more power detectors that is connected to the aggressor 102 and/or the victim 104 or a component of the aggressor 102 and/or the victim 104.

In the embodiment depicted in FIG. 1, the aggressor 102 is defined as a device causing interference, and the victim 104 is defined as a device that is receiving a coupled signal from the aggressor that generates an IMD3 signal in the victim's transceiver. For example, the aggressor 102 may implement a narrowband transceiver (e.g., a Bluetooth (BT) transceiver), and the victim may implement a wireless local area network (WLAN) transceiver (e.g., a Wi-Fi transceiver that is compatible with an Institute of Electrical and Electronics Engineers (IEEE) 802.11 protocol). In another example, the aggressor 102 may implement a WLAN transceiver (e.g., a Wi-Fi transceiver that is compatible with an IEEE 802.11 protocol), and the victim may implement a narrowband transceiver (e.g., a BT transceiver).

In the embodiment depicted in FIG. 1, the aggressor 102 includes a power amplifier (PA) 112, a balun transformer 114 with a ratio of N1:N2, where N1, N2 are positive integers, and an antenna 118 configured to transmit signals output by the power amplifier 112. If the wireless system 100 (e.g., the aggressor 102) is implemented on a chip, a pad or port 116 connects the balun transformer 114 and the antenna 118. The aggressor 102 may include a receiver (not shown) that is connected between the PA 112 and the antenna 118. In some embodiments, the aggressor 102 is implemented as a narrowband transceiver (e.g., a BT transceiver). In some embodiments, the aggressor 102 is implemented as a WLAN transceiver (e.g., a Wi-Fi transceiver that is compatible with an IEEE 802.11 protocol). The antenna 118 may be any suitable type of antenna.

In the embodiment depicted in FIG. 1, the victim 104 includes a power amplifier (PA) 132, a balun transformer 134 with a ratio of N3:N4, where N3, N4 are positive integers, and an antenna 138 configured to transmit signals output by the power amplifier 132. If the wireless system 100 (e.g., the victim 104) is implemented on a chip, a pad or port 136 connects the balun transformer 114 and the antenna 118. The victim 104 may include a receiver (not shown) that is connected between the PA 132 and the antenna 138. In some embodiments, the victim 104 is implemented as a WLAN transceiver (e.g., a Wi-Fi transceiver that is compatible with an IEEE 802.11 protocol). In some embodiments, the victim 104 is implemented as a narrowband transceiver (e.g., a BT transceiver). The antenna 138 may be any suitable type of antenna.

In the embodiment depicted in FIG. 1, the antennas 118, 138 are connected to the power amplifiers 112, 132 using the balun transformers 114, 134 in order to provide direct current (DC) isolation and impedance transformation. While balun transformers 114, 134 are illustrated herein, any type of baluns may be used that satisfies the system requirements. One way to decrease the IMD3 signal is to increase the balun transformer primary to secondary turns ratio. However, increasing the balun transformer primary to secondary turns ratio can increase the size, cost, power consumption, and space of the balun transformer, so this approach is undesirable. Another approach would be to use a very sharp and tunable narrow band filter to filter out the IMD3 component, but would be very difficult to implement. Another approach would be to generate a cancellation signal with the same magnitude but 180° out of phase with respect to the IMD3 signal. However, this is challenging as the dynamic range can be very large. Another approach is to generate a cancellation signal that cancels out the coupled interference signal present at the output of the PA 132 of the victim 104, using the cancellation circuit 106 for IMD3 cancellation between the aggressor 102 and the victim 104.

FIG. 2 illustrates example frequency plots of signals transmitted by the power amplifiers 112, 132 of the aggressor 102 and the victim 104 of the wireless system 100 depicted in FIG. 1 without signal cancellation. Plot (A) of FIG. 2 illustrates the transmission of a signal 204 by the victim 104 at a frequency of f2 having a power of 21 dBm. Plot (B) of FIG. 2 illustrates the transmission of a signal 202 by the aggressor 102 at a frequency of f1 having a power of 21 dBm. The arrow 205 illustrates coupling of the signal 202 onto the signal 204. Plot (C) of FIG. 2 illustrates presence of the signal 206 at f1, which is an attenuated version of the signal 202 by the aggressor 102, along with the signal 204 at f2. The attenuated signal 206 may have a power of −5 to 5 dBm, for example. The signal 204 by the victim 104 and the signal 206 at f1 may intermodulate to generate an IMD3 signal at 2*f2−f1 due to nonlinearities in the power amplifier 132. When the signal 202 by the aggressor 102 is being transmitted at high power, this IMD3 signal may be large enough to exceed regulatory emission limits (e.g., −41 dBm/MHz specified by the FCC). Plot (D) of FIG. 2 illustrates the transmission of the signal 202 by the aggressor 102 at the frequency of f1 having a power of 21 dBm, which is not affected by the transmission of the signal 204 by the victim 104. However, in some embodiments, the signal 202 by the aggressor 102 at the frequency of f1 is also affected by the transmission of the signal 204 by the victim 104. In these embodiments, bi-directional coupling takes place in which the aggressor 102 and the victim 104 are both aggressor and victim at the same time.

FIG. 3 illustrates the addition of a cancellation signal that is generated by the cancellation circuit 106 at the output of the power amplifier PA 132 of the victim 104 of the wireless system 100 depicted in FIG. 1. FIG. 3 shows the same 4 plots as FIG. 2, but FIG. 3 also illustrates a cancellation signal 315 in plot (C). The cancellation signal 315 has a magnitude equal to the magnitude of the signal 206 at f1 and a phase difference of 180° from the signal 206 at f1. This signal seeks to cancel or greatly reduce the signal 206 present at the output of the power amplifier 132 of the victim 104. This results in a reduction of the resulting IMD3 signal at frequency 2*f2−f1, which results in an IMD3 signal level that meets and/or exceeds regulatory requirements.

In a related patent application Applicant Ser. No. 17/205, 591, filed on Mar. 19, 2021, now U.S. Pat. No. 11,374,615, titled "Third Order Intermodulation Distortion Cancelation," an IMD3 cancelation technique is described. However, antenna to antenna isolation variation may exist across difference channels. In addition, power detector dynamic range may be limited. Further, on-chip coupling, for example, either wire-bonding or on-chip transformer/routing mutual coupling, may exist. Additionally, multiple antennas to antenna coupling configuration across multiple platforms need to be supported.

Turning back to the embodiment depicted in FIG. 1, the controller 108 controls the aggressor 102, the victim 104, and/or the cancellation circuit 106 for IMD3 cancellation between the aggressor 102 and the victim 104 to perform pre-conditional calibration. By performing pre-conditional calibration, IMD3 cancelation can be performed when antenna to antenna isolation variation exists across difference channels and when power detector dynamic range may be limited. In addition, by performing pre-conditional calibration, on-chip coupling, for example, either wire-bonding or on-chip transformer/routing mutual coupling, can be reduced. Further, by performing pre-conditional calibration, multiple antennas to antenna coupling configuration across multiple platforms can be supported. In some embodiments, the controller 108 re-configs the setting of the cancellation path in each individual channel such that the cross-coupling aggressor tones between two simultaneously transmitting power amplifiers 112, 132 is effectively cancelled out by the cancellation circuit 106 with all conditions of antenna to antenna coupling. Subsequently, the corresponding limitation of the IMD3 in each transmitter can be eliminated. The controller 108 enables the possibility of the high-power concurrent transmitters without violating the spectrum mask due to the IMD3 from the crossing coupling between multiple transmitters. The controller 108 may be implemented as at least one processor (e.g., a microcontroller, a digital signal processor (DSP), and/or a central processing unit (CPU)).

In some embodiments, a pre-conditioning calibration step is performed. Subsequently, a configuration (e.g., phase and/or radius) for the cancellation circuit 106 is obtained. For example, the aggressor 102 operates in a continuous wave (CW) tone mode and sends a CW signal to the victim 104, and the victim operates in an idle mode and generates no output signal. The victim may measure the aggressor tone, for example, using a power detector. The controller 108 tunes the cancellation circuit 106 until the aggressor tone is at a minimum value and repeats those steps until all sub-channels are done.

In some embodiments, the controller 108 is configured to, for each frequency channel of the aggressor 102, perform a pre-conditional calibration of the cancellation circuit 106, after the pre-conditional calibration, determine a phase configuration for the cancellation circuit, and after the phase configuration for the cancellation circuit is determined, determine an attenuation configuration for the cancellation circuit. The controller may be further configured to turn off (i.e., make inoperable, for example, by sending a disablement signal to) a phase interpolator and an auxiliary amplifier of the cancellation circuit and turn on (i.e., make operable, for example, by sending an enablement signal to) a mixer, a power amplifier driver, and a power amplifier of the victim 104. The controller may be further configured to measure a power value at an output of a power amplifier of the victim 104 while the phase interpolator and the auxiliary amplifier of the cancellation circuit are turned off and the mixer, the power amplifier driver, and the power amplifier of the victim 104 are turned on. The controller may be further configured to, for each frequency channel of the aggressor 102, configure a bias setting and an attenuation setting of the phase interpolator and a bias setting of the auxiliary amplifier of the cancellation circuit based on a look-up table that contains the power value at the output of the power amplifier of the victim 104. In some embodiments, the controller is further configured to determine a phase quadrant for the cancellation circuit and determine a phase setting within the phase quadrant for the cancellation circuit. In some embodiments, the controller is further configured to select a phase quadrant for the cancellation circuit that corresponds to a lowest power value at the output of the power amplifier of the victim 104 and determine a phase setting within the phase quadrant for the cancellation circuit that corresponds to a lowest power value at the output of the power amplifier of the victim 104. In some embodiments, the controller is further configured to after the phase configuration for the cancellation circuit is determined, determine a capacitor divider value for an attenuator of the cancellation circuit.

Figure 4:
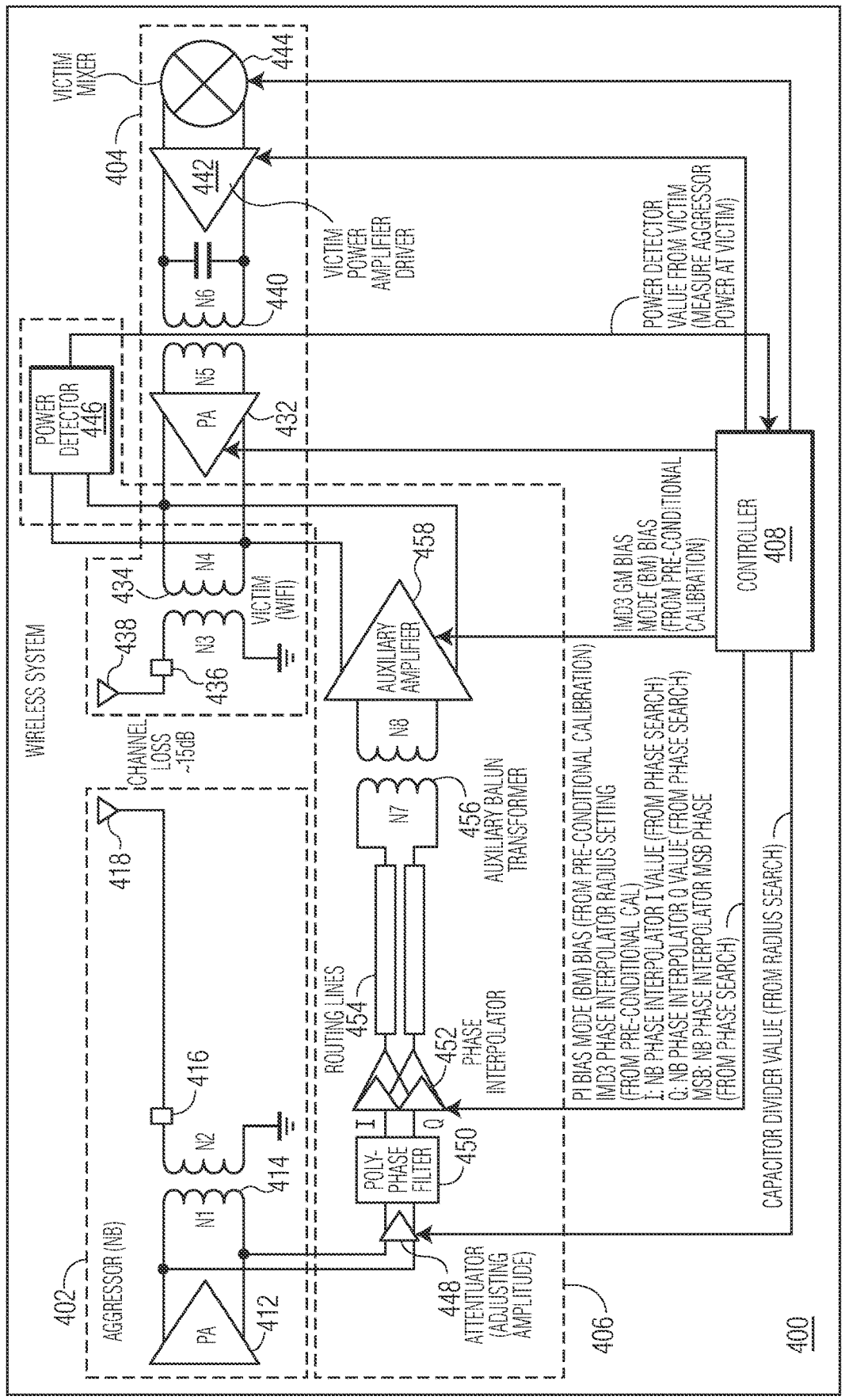
FIG. 4 depicts a wireless system, which is an embodiment of the wireless system depicted in FIG. 1.

FIG. 4 depicts a wireless system 400, which is an embodiment of the wireless system 100 depicted in FIG. 1. However, the wireless system 100 depicted in FIG. 1 is not limited to the embodiment depicted in FIG. 4. In the embodiment depicted in FIG. 4, the wireless system 400 includes an aggressor 402, a victim 404, a cancellation circuit 406, and a controller 408. In the embodiment depicted in FIG. 4, the aggressor 402 is defined as a device causing interference, and the victim 404 is defined as a device that is receiving a coupled signal from the aggressor that generates an IMD3 signal in the victim's transceiver. In some embodiments, the aggressor 402 and the victim 404 are located on the same IC chip. In some embodiments, the aggressor 402 and the victim 404 are located in close proximity but in different IC chips. Although the wireless system is shown in FIG. 4 as including certain circuit elements, in other embodiments, the wireless system 400 may include one or more additional circuit elements.

In the embodiment depicted in FIG. 4, the aggressor 402 implements a narrowband transceiver (e.g., a BT transceiver), and the victim 404 implements a WLAN transceiver (e.g., a Wi-Fi transceiver that is compatible with an IEEE 802.11 protocol). However, in some embodiments, the aggressor 402 implements a WLAN transceiver (e.g., a Wi-Fi transceiver that is compatible with an IEEE 802.11 protocol), and the victim implements a narrowband transceiver (e.g., a BT transceiver).

In the embodiment depicted in FIG. 4, the aggressor 402 (also referred to as the NB aggressor 402) includes a power amplifier (PA) 412, a balun transformer 414 with a ratio of N1:N2, where N1, N2 are positive integers, and an antenna 418 configured to transmit signals output by the power amplifier 412. If the wireless system 400 (e.g., the aggressor 402) is implemented on a chip, a pad or port 416 connects the balun transformer 414 and the antenna 418. The aggressor 402 may include a receiver (not shown) that is connected between the PA 412 and the antenna 418. The antenna 418 may be any suitable type of antenna.

In the embodiment depicted in FIG. 4, the victim 404 (also referred to as the Wi-Fi victim 404) includes a power amplifier (PA) 432, a balun transformer 434 with a ratio of N3:N4, where N3, N4 are positive integers, and an antenna 438 configured to transmit signals output by the power amplifier 432. In addition, the victim 404 includes an auxiliary balun transformer 440 with a ratio of N5:N6, where N5, N6 are positive integers, a power amplifier driver (PAD) 442 (also referred to as the victim PAD), and a mixer 444 (also referred to as the Wi-Fi mixer). In some embodiments, the PAD 442 is configured to, when enabled or turned on, generate a driver signal for the power amplifier 432. The controller 408 may be configured to turn off (e.g., make inoperable, for example, by sending a disablement signal to) or turn on (e.g., make operable, for example, by sending an enablement signal to) the mixer 444, the PAD 442, and the power amplifier 432 of the victim 404. If the wireless system 400 (e.g., the victim 404) is implemented on a chip, a pad or port 436 that connects the balun transformer 414 and the antenna 418. The victim 404 may include a receiver (not shown) that is connected between the PA 432 and the antenna 438. In some embodiments, the victim 404 is implemented as a WLAN transceiver (e.g., a Wi-Fi transceiver that is compatible with an IEEE 802.11 protocol). In some embodiments, the victim 404 is implemented as a narrowband transceiver (e.g., a BT transceiver). The antenna 438 may be any suitable type of antenna. In the embodiment depicted in FIG. 4, the antennas 418, 438 are connected to the power amplifiers 412, 432 using the balun transformers 414, 434 in order to provide DC isolation and impedance transformation. While balun transformers 414, 434, 440 are illustrated herein, any type of baluns may be used that satisfies the system requirements.

In the embodiment depicted in FIG. 4, the cancellation circuit 406 is configured to generate a cancellation signal that cancels out the coupled interference signal present at the output of the PA 432 of the victim 404. In the embodiment depicted in FIG. 4, the cancellation circuit 406 includes a power detector 446 (also referred to as the NB power detector) configured to measure the power at the output of the Wi-Fi PA 432 (e.g., by measuring the voltage at the output of the Wi-Fi PA 432), an attenuator 448, a poly-phase filter or an I/Q demodulator 450, a phase interpolator 452, routing lines 454, an auxiliary balun transformer 456, and an auxiliary amplifier 458 (e.g., an auxiliary power amplifier). In some embodiments, the power detector 446 is a component of the victim 404. In some embodiments, the wireless system 400 (e.g., the cancellation circuit 406) includes an NB power detector 446 measures the power at the output of the NB PA 412 (e.g., by measuring the voltage at the output of the NB PA 412). While the auxiliary balun transformer 456 is illustrated herein, any type of balun may be used that satisfies the system requirements. In some embodiments, the controller 408 is configured to turn off (e.g., make inoperable, for example, by sending a disablement signal to) or turn on (e.g., make operable, for example, by sending an enablement signal to) the phase interpolator 452 and the auxiliary amplifier 458 of the cancellation circuit 406.

To explain how to cancel the aggressor cross coupled signal by the victim, the aggressor will be the NB transceiver and the victim will be the Wi-Fi transceiver. In the embodiment depicted in FIG. 4, the attenuator 448 is connected to the output of the NB PA 412 of the aggressor 402 and is configured to produce an attenuated NB PA signal. In some embodiments, the amount of attenuation applied by the attenuator 448 is a coarse attenuation and is based upon amount of coupling loss between the antennas 418, 438. The coupling loss value may be, for example, in the range of 15 dB to 25 db. In the embodiment depicted in FIG. 4, the poly-phase filter or the I/Q demodulator 450 is configured to generate I and Q signals (i.e., in-phase and quadrature signals). In the embodiment depicted in FIG. 4, the phase interpolator is configured to attenuate and apply a phase shift to the I and Q signals that are generated by the poly-phase filter or the I/Q demodulator 450 and to recombine the I and Q signals. The phase shift applied to the signal may be determined during a calibration phase. The phase values may be determined during calibration for different frequency channels and may be frequency dependent. When a specific transmit frequency is used, values from a look-up table may be used and an interpolated phase value may be determined and applied. Similarly, the attenuation applied to the signal may be determined during a calibration phase. The attenuation values may be determined during calibration for different frequency channels and may be frequency dependent. When a specific transmit frequency is used, values from a look-up table may be used and an interpolated attenuation value may be determined and applied. Determining specific calibration values for a specific frequency may be performed based on a piecewise curve or other function that describes the variation of the calibration parameters over frequency. In the embodiment depicted in FIG. 4, the output of the phase interpolator 452 is routed over routing lines 454 to the auxiliary balun transformer 456 that couples the output signal to the auxiliary amplifier 458. The auxiliary balun transformer 456 provides DC isolation between the NB PA 412 and the auxiliary amplifier 458 and the Wi-Fi PA 432. In the embodiment depicted in FIG. 4, the auxiliary amplifier 458 is configured to amplify the received cancellation signal and outputs the cancellation signal on the output lines of the Wi-Fi PA 432. In some embodiments, the auxiliary amplifier 458 is a scaled version of the Wi-Fi PA 432 such that the auxiliary amplifier 458 has a similar or identical operating characteristic as the Wi-Fi PA 432. For example, the auxiliary amplifier 458 may be a ⅛ scale version of the Wi-Fi PA 432. With proper calibration, the cancellation signal output by the auxiliary amplifier 458 can cancel the cross coupled NB PA signal found at the Wi-Fi PA 432 and hence reduce or the IMD3 signal.

In the embodiment depicted in FIG. 4, the controller 408 controls the cancellation circuit 406 and the victim 404 to perform pre-conditional calibration. Specifically, the controller 408 receives the measured power information at the output of the Wi-Fi PA 432 and controls the signal amplitude (e.g., the capacitor divider value when the attenuator is implemented as a capacitor voltage divider) of the attenuator 448, the phase and the signal bias of the phase interpolator, and the signal bias at the auxiliary amplifier 458 based on the measured power information to perform pre-conditional calibration. In some embodiments, the controller 408 also controls the aggressor 402 to perform pre-conditional calibration. The controller 408 may be implemented as at least one processor (e.g., a microcontroller, a DSP, and/or a CPU).

Figure 5:
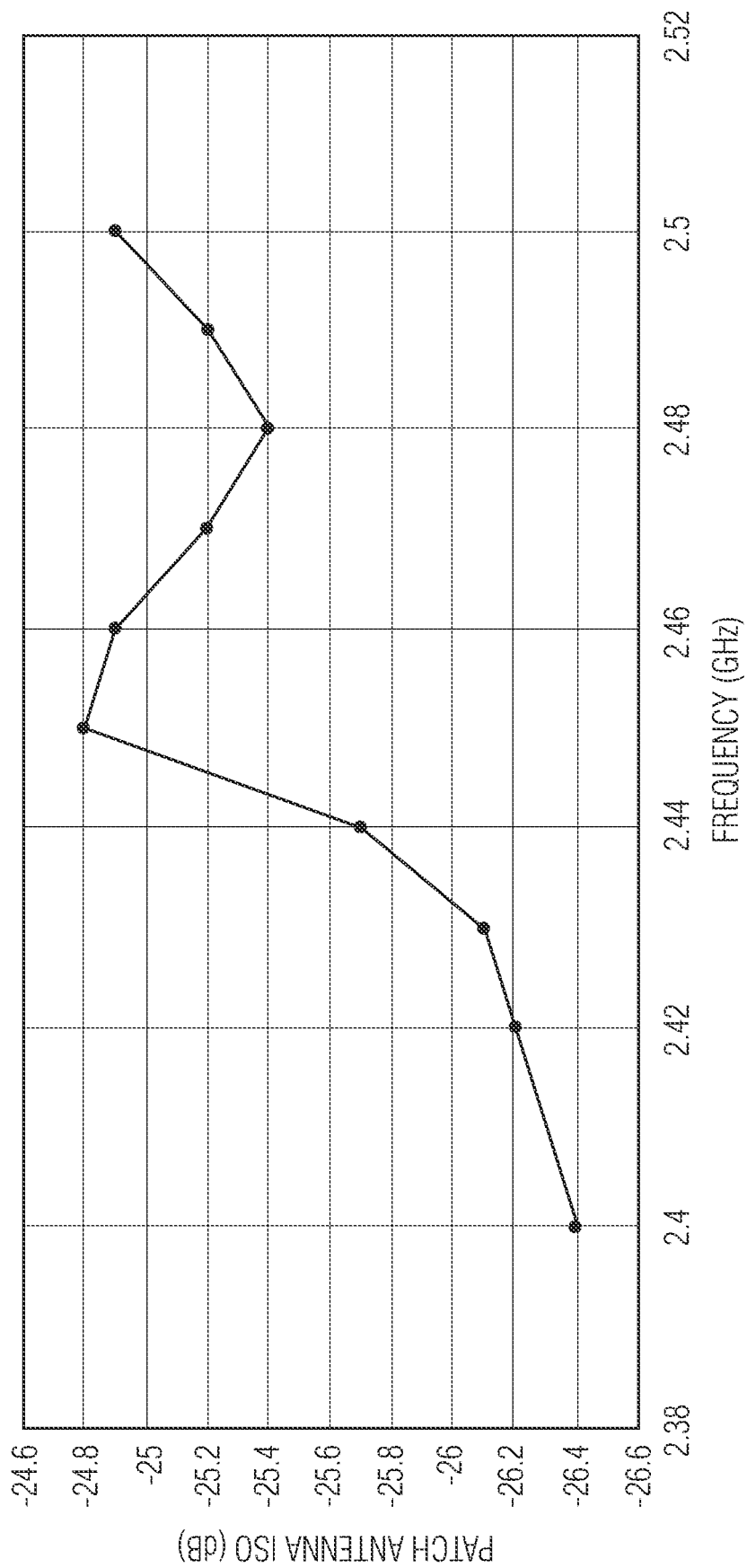
FIG. 5 depicts an example patch antenna isolation diagram for the wireless system depicted in FIG. 4.

Antenna to antenna isolation variation may exist across difference frequency channels. FIG. 5 depicts an example patch antenna isolation diagram for the wireless system 400 depicted in FIG. 4. As depicted in FIG. 5, patch antenna isolation (in dB) varies across different frequency channels (e.g., between frequency 2.4 GHz and frequency 2.5 GHz). IMD3 calibration can be highly sensitive to parameters, such as Band select (BandSEL) or Switchable Q-Factor degradation resistor/resistance (DeQ) of the PAD 442 of the victim 404. For example, device coupling is dependent on Bandsel and DeQ of the PAD 442 of the victim 404. In the embodiment depicted in FIG. 4, the controller 408 performs pre-conditional calibration to calibrate the cancellation path gain-lineup across each frequency channel.

Figure 6:
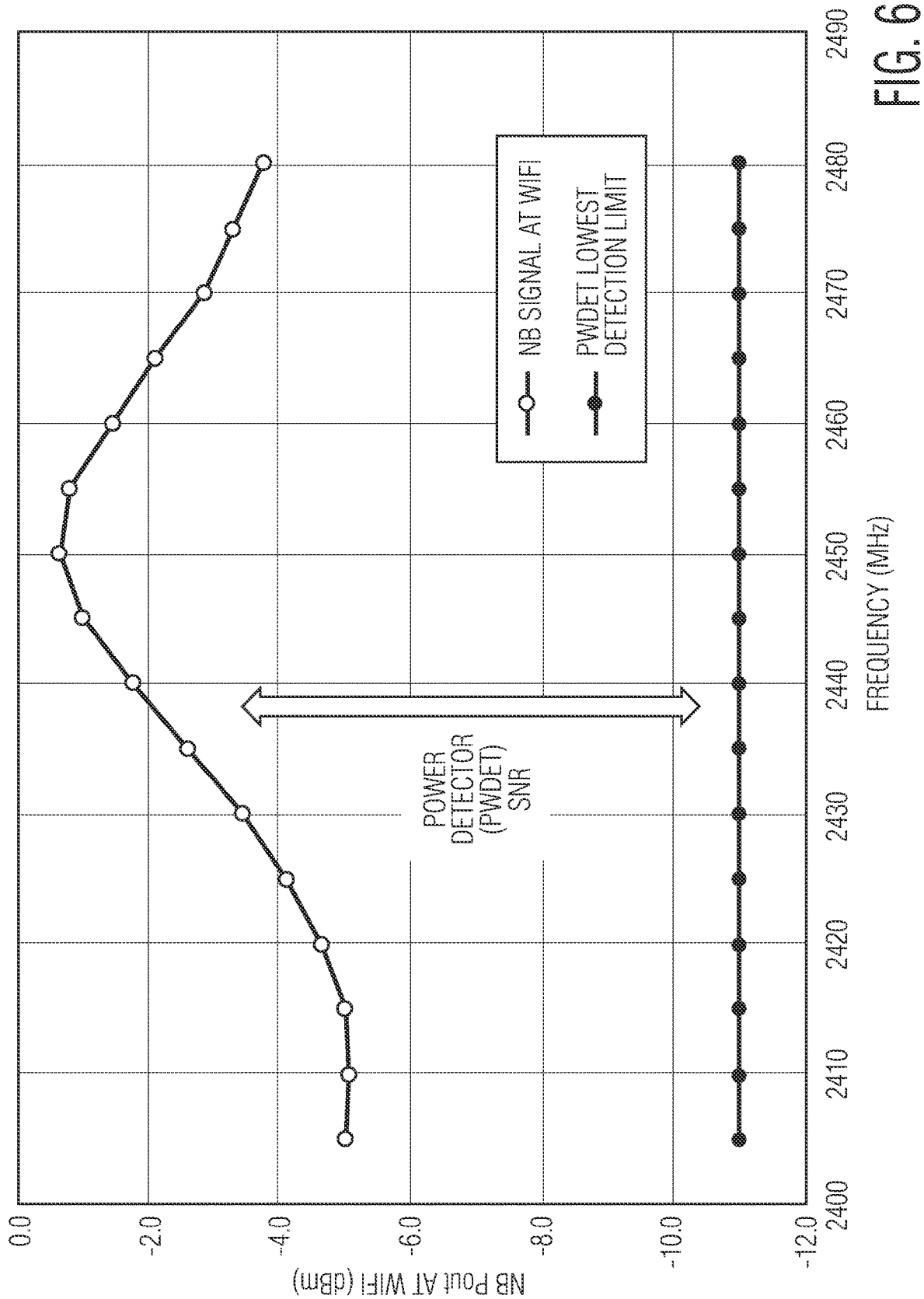
FIG. 6 depicts an example SNR diagram for a power detector of the wireless system depicted in FIG. 4.

Power detector Signal-to-noise ratio (SNR) may vary across difference frequency channels. FIG. 6 depicts an example SNR diagram for the power detector 446 of the wireless system 400 depicted in FIG. 4. As depicted in FIG. 6, power detector SNR (in dBm) varies across different frequency channels. In the embodiment depicted in FIG. 4, the controller 408 performs pre-conditional calibration for each frequency channel in response to the power detector SNR variation over frequency channels.

Turning back to the embodiment depicted in FIG. 4, pre-conditional calibration is performed for each frequency channel. By performing pre-conditional calibration, IMD3 cancelation can be performed when antenna to antenna isolation variation exists across difference channels and when power detector dynamic range is limited. In addition, by performing pre-conditional calibration, on-chip coupling, for example, either wire-bonding or on-chip transformer/routing mutual coupling, can be reduced. Further, by performing pre-conditional calibration, multiple antennas to antenna coupling configuration across multiple platforms can be supported. In some embodiments, the controller 408 re-configs the setting of the cancellation path in each individual channel such that the cross-coupling aggressor tones between two simultaneously transmitting power amplifiers 412, 432 is effectively cancelled out by the cancellation circuit 406 with all conditions of antenna to antenna coupling. Subsequently, the corresponding limitation of the IMD3 in each transmitter can be eliminated. The controller 408 enables the possibility of the high-power concurrent transmitters without violating the spectrum mask due to the IMD3 from the crossing coupling between multiple transmitters.

In some embodiments, a pre-conditioning calibration step is performed. Subsequently, a configuration (e.g., phase and/or radius (e.g., attenuation)) for the cancellation circuit 406 is obtained. For example, the aggressor 402 operates in a continuous wave (CW) tone mode and sends a CW signal to the victim 404. The victim 404 operates in an idle mode and generates no output signal. The victim may measure the aggressor tone, for example, using a power detector. The controller 408 tunes the cancellation circuit 406 until the aggressor tone is at a minimum value, stores tuning configuration, and repeats those steps until all sub-channels are done.

In some embodiments, calibration is performed for each frequency channel of the aggressor 402 because of unknown Voltage Standing Wave Ratio (VSWR) effect and unknown isolation for a specific frequency channel. When the aggressor 402 sends a CW signal to the victim 404 on a frequency channel, the NB cancellation path is turned off, the Wi-Fi mixer 444, the victim PAD 442, and the Wi-Fi PA is turned on, and the power detector 446 records or reads a power detection value. In some embodiments, for every 5 MHz NB frequency channel out of a total number of 16 frequency channels, the NB aggressor 402 sends a CW tone at Psat, which is the output power when the PA 412 is saturated, to the Wi-Fi victim 404. The Wi-Fi victim 404 uses the power detector 446 to measure the coupling power. Based on the power measurement results from the power detector 446, the gain line-up in IMD3 cancelling path (in both NB and Wi-Fi) is adjusted. For example, for NB, IMD3 Phase Interpolator Bias (IMD3 PI BM) and IMD3 Phase Interpolator radius setting of the phase interpolator 452 are adjusted or set based on the power measurement results from the power detector 446. In another example, a default radius of 16 corresponds to an isolation of 25 dB, a radius of 12 corresponds to an isolation of 30 dB, a radius of 24 corresponds to an isolation of 20 dB or 15 dB. For Wi-Fi, IMD3 Auxiliary PA Bias (IMD3 GM BM) of the auxiliary amplifier 458 is adjusted or set based on the power measurement results from the power detector 446.

Figure 7:
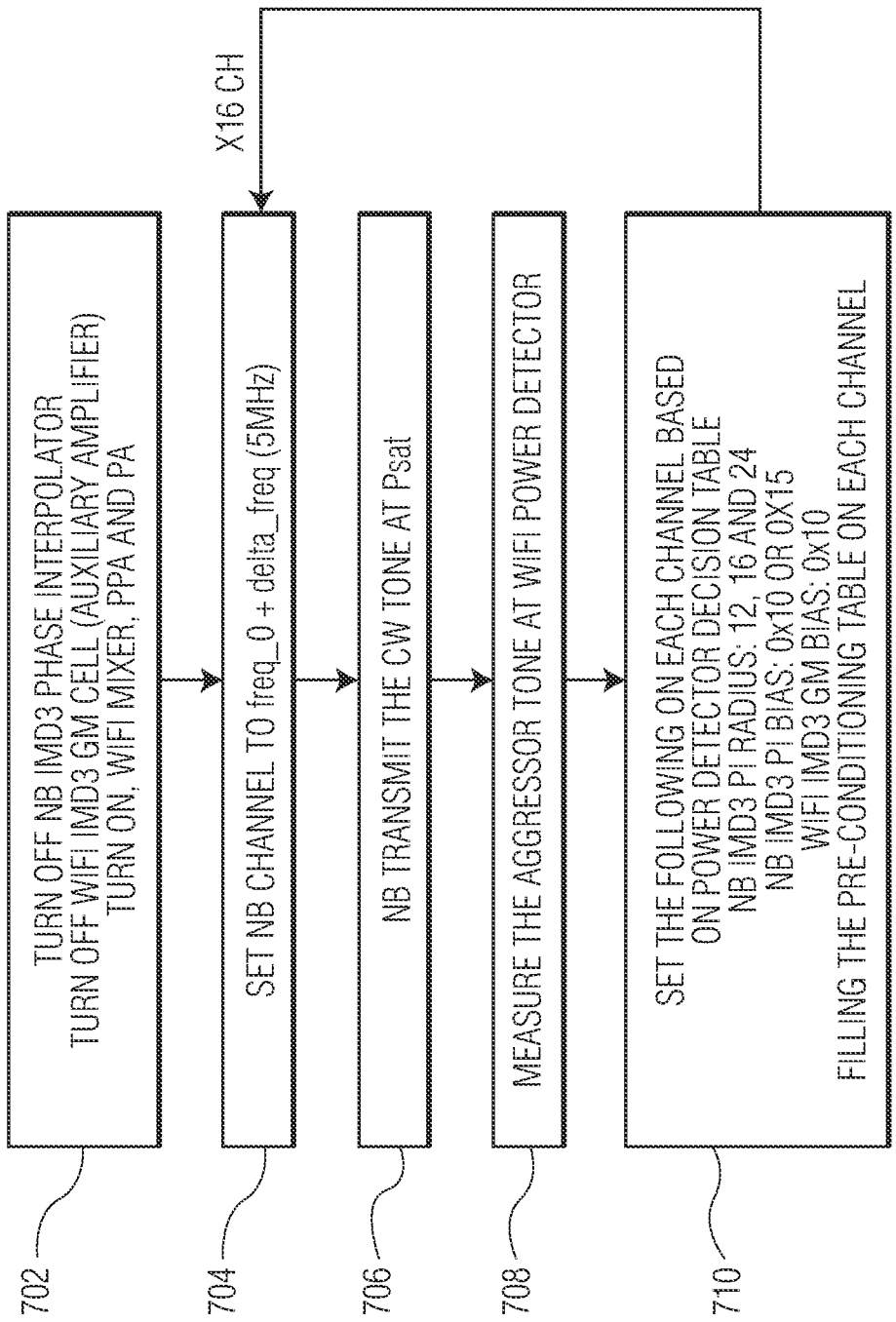
FIG. 7 is a process flow diagram of a method of pre-conditioning calibration in accordance to an embodiment of the invention.

FIG. 7 is a process flow diagram of a method of pre-conditioning calibration in accordance to an embodiment of the invention. According to the method, at block 702, the phase interpolator 452 and the auxiliary amplifier 458 are turned off (i.e., made inoperable by the controller 408, for example, by sending a disablement signal to the phase interpolator 452 and the auxiliary amplifier 458) and the Wi-Fi mixer 444, the PAD 442, and the Wi-Fi PA 432 are turned on (i.e., made operable by the controller 408, for example, by sending an enablement signal to the Wi-Fi mixer 444, the PAD 442, and the Wi-Fi PA 432). At block 704, the NB frequency channel is set to freq_0 (an initial frequency)+delta_freq (an incremental frequency range, e.g., 5 MHz). At block 706, the NB aggressor 402 transmits a CW tone or signal at Psat, which is the output power when the PA 412 is saturated, to the Wi-Fi victim 404. At block 708, the power detector 446 measures the aggressor tone, for example, by measuring the power of the output signal at the PA 432.

At block 710, a calibration configuration is set for the cancellation circuit 406 based on, for example, a table (e.g., a look-up table (LUT)), a function, or a combination of a table and a function and the process goes back to block 704 and repeats for 16 frequency channels. For example, based on a power detector decision table, the following parameters are set on each frequency channel of the aggressor 402. For example, an NB IMD3 PI Radius of 12, 16 or 24 of the phase interpolator 452, an NB IMD3 PI BIAS of 0×10 or 0×15 of the phase interpolator 452, and a Wi-Fi IMD3 GM BIAS of 0×10, 0×15, or 0×0 of the auxiliary amplifier 458 are set based on the power detector decision table. Table-1 provides an example of a power detector decision table. In Table-1, under different isolation (ISO) values, Wi-Fi power detector values (PWDET), IMD3 radius values of the phase interpolator 452, NB IMD3 PI bias values of the phase interpolator 452, and Wi-Fi IMD3 bias values of the auxiliary amplifier 458 are listed. Under the control of the controller 408, the cancellation circuit 406 can set the parameters for the phase interpolator 452 and the auxiliary amplifier 458 based on the power detector decision table. In some embodiments, a pre-conditioning table on each frequency channel is filled with the calibration configuration. Table-2 provides an example of a pre-conditioning table for 16 frequency channels (CHs).

| Isolation | WiFi POWER Detector Value | IMD3 Radius | NB IMD3 PI BM | WiFi IMD3 BM |
|---|---|---|---|---|
| ISO < 19 dB | PWDET > 0 × 90 | 24 | 0 × 15 | 0 × 15 |
| 19 dB =< ISO < 25 dB | 0 × 50 < PWDET =< 0 × 90 | 24 | 0 × 10 | 0 × 10 |
| 25 dB =< ISO < 29 dB | 0 × 3A < PWDET =< 0 × 50 | 16 | 0 × 10 | 0 × 10 |
| 29 dB =< ISO < 33 dB | 0 × 30 < PWDET =< 0 × 3A | 12 | 0 × 10 | 0 × 10 |
| 33 dB <= ISO | PWDET =< 0 × 30 | 0 | 0 × 0 | 0 × 0 |

| NB Frequency Channel | WiFi POWER Detector Value | IMD3 Radius | NB IMD3 PI BM | WiFi IMD3 BM |
|---|---|---|---|---|
| 1 | | | | |
| 2 | | | | |
| 3 | | | | |
| .... | | | | |
| 16 | | | | |

After the pre-conditioning calibration step, a phase search step is performed to find or obtain phase configuration for the phase interpolator 452. For example, an in-phase (I) value for the phase interpolator 452, a quadrature (Q) value for the phase interpolator 452, and a most significant bit (MSB) value for the phase interpolator 452 are obtained or found by the controller 408. In some embodiments, in the phase search step, the Wi-Fi mixer 444 and the PAD 442 (e.g., the Band select (BandSEL) of the PAD 442) are configured or adjusted to off tune the balun transformers 434, 440 in order to reduce the on-chip coupling. In some embodiments, a binary search or other search is performed in each Quadrant (Quad) (MSB Phase 0, 1, 2, 3) of the phase interpolator 452. For example, Quad 0 has a range of 0-89 degree, Quad 1 has a range of 90-179 degree, Quad 2 has a range of 180-269 degree, and Quad 3 has a range of 270-359 degree. The controller 408 picks or selects the Quadrant with the lowest power detector (PWDET) value from the Wi-Fi victim 404. In some embodiments, from the optimum Quadrant, a linear search or other search method, such as, a binary search, is performed on this Quadrant, for example, with a fixed step. For example, when Quad 0 is selected as the optimum Quadrant, in the range of 0 degree to 89 degree, a search is performed with 5-degree step, for example, 0, 5, 10 . . . 85 degree. The controller 408 can pick I and Q values for the optimum Phase (e.g., I and Q values that corresponding to the lowest power detector (PWDET)).

After the phase search step, a radius (e.g., attenuation) search step is performed to find or obtain radius configuration for the attenuator 448. For example, the controller 408 finds or obtains a capacitor divider value when the attenuator is implemented as a capacitor voltage divider after the I and Q values for the phase interpolator 452 are determined in the phase search step. In some embodiments, a linear search or other search method, such as, binary search, is performed to find a capacitor divider (CAPDIV) value for the attenuator 448. In some embodiments, the optimum CAPDIV (Radius) value with the lowest power detector (PWDET) value is picked or selected.

Figure 8:
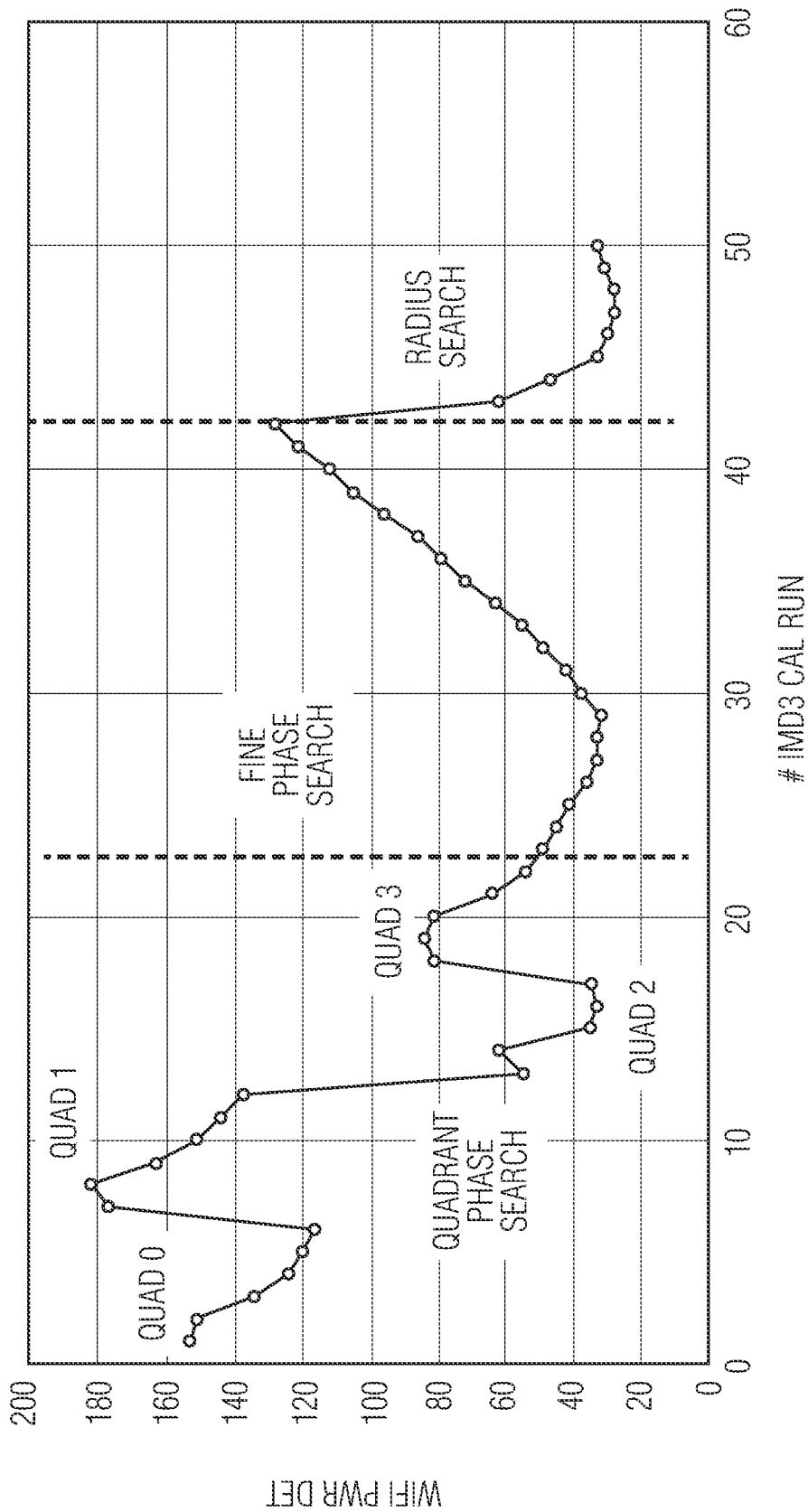
FIG. 8 depicts an example phase and radius search diagram for the wireless system depicted in FIG. 4.

FIG. 8 depicts an example phase and radius search diagram for the wireless system 400 (e.g., the phase interpolator 452 and the attenuator 448) depicted in FIG. 4. As depicted in FIG. 8, IMD3 calibration is performed in three stages. Firstly, quadrant phase search is performed, for example, to find a quadrant (e.g., Quad 2) with a lowest corresponding Wi-Fi power detector (PWDET) value. Secondly, fine phase search is performed, for example, to find phase values (e.g., the I and Q values) for the phase interpolator 452 in the quadrant that is found (e.g., Quad 2) with a lowest corresponding Wi-Fi power detector (PWDET) value. Thirdly, a radius search is performed to find an optimum CAPDIV (Radius) value with the lowest corresponding power detector (PWDET) value with the I and Q values for the phase interpolator 452 determined in the fine phase search.

It should be noted that at least some of the operations described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk.

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A calibration system for third order intermodulation distortion (IMD3) cancellation, the calibration system comprising:

a cancellation circuit for IMD3 cancellation between a first transmitter and a second transmitter; and
a controller coupled to the cancellation circuit and configured to:
for each frequency channel of the first transmitter, perform a pre-conditional calibration of the cancellation circuit;
after the pre-conditional calibration, determine a phase configuration for the cancellation circuit; and
after the phase configuration for the cancellation circuit is determined, determine an attenuation configuration for the cancellation circuit.

2. The calibration system of claim 1, wherein the controller is further configured to turn off a phase interpolator and an auxiliary amplifier of the cancellation circuit and turn on a mixer, a power amplifier driver, and a power amplifier of the second transmitter.

3. The calibration system of claim 2, wherein the controller is further configured to measure a power value at an output of a power amplifier of the second transmitter while the phase interpolator and the auxiliary amplifier of the cancellation circuit are turned off and the mixer, the power amplifier driver, and the power amplifier of the second transmitter are turned on.

4. The calibration system of claim 3, wherein the controller is further configured to, for each frequency channel of the first transmitter, configure the phase interpolator of the cancellation circuit and the auxiliary amplifier of the cancellation circuit based on the power value at the output of the power amplifier of the second transmitter.

5. The calibration system of claim 4, wherein the controller is further configured to, for each frequency channel of the first transmitter, configure a bias setting and an attenuation setting of the phase interpolator and a bias setting of the auxiliary amplifier of the cancellation circuit based on the power value at the output of the power amplifier of the second transmitter.

6. The calibration system of claim 5, wherein the controller is further configured to, for each frequency channel of the first transmitter, configure the bias setting and the attenuation setting of the phase interpolator and the bias setting of the auxiliary amplifier of the cancellation circuit based on a look-up table that contains the power value at the output of the power amplifier of the second transmitter.

7. The calibration system of claim 1, wherein the controller is further configured to:
determine a phase quadrant for the cancellation circuit; and
determine a phase setting within the phase quadrant for the cancellation circuit.

8. The calibration system of claim 1, wherein the controller is further configured to:
select a phase quadrant for the cancellation circuit that corresponds to a lowest power value at an output of a power amplifier of the second transmitter; and
determine a phase setting within the phase quadrant for the cancellation circuit that corresponds to a lowest power value at the output of the power amplifier of the second transmitter.

9. The calibration system of claim 7, wherein the controller is further configured to configure a mixer and a power amplifier driver of the second transmitter.

10. The calibration system of claim 1, wherein the controller is further configured to:
after the phase configuration for the cancellation circuit is determined, determine a capacitor divider value for an attenuator of the cancellation circuit.

11. The calibration system of claim 1, wherein the cancellation circuit comprises:
an attenuator configured to attenuate a transmitted signal from the first transmitter;
an I/Q demodulator configured to split an attenuated signal into in-phase (I) and quadrature signals (Q);
a phase interpolator configured to apply a calibration phase shift and a calibration attenuation to the I and Q signals and to recombine the I and Q signals;
an auxiliary balun coupled to an output of the phase interpolator; and
an auxiliary power amplifier with an input connected to the auxiliary balun configured to generate a cancellation signal, wherein an output of the auxiliary power amplifier is connected to an output of the second transmitter.

12. The calibration system of claim 11, wherein the cancellation circuit further comprises routing lines connecting the phase interpolator to the auxiliary balun.

13. A calibration system for third order intermodulation distortion (IMD3) cancellation, the calibration system comprising:
a cancellation circuit for IMD3 cancellation between a first wireless transmitter and a second wireless transmitter; and
a controller coupled to the cancellation circuit and configured to:
for each frequency channel of the first wireless transmitter, perform a pre-conditional calibration of the cancellation circuit by measuring a power value at an output of a power amplifier of the second wireless transmitter while a phase interpolator and an auxiliary amplifier of the cancellation circuit are turned off and a mixer, a power amplifier driver, and the power amplifier of the second wireless transmitter are turned on;
after the pre-conditional calibration, determine a phase configuration for the phase interpolator; and
after the phase configuration for the phase interpolator is determined, determine an attenuation configuration for the cancellation circuit.

14. The calibration system of claim 13, wherein the controller is further configured to, for each frequency channel of the first wireless transmitter, configure a bias setting and an attenuation setting of the phase interpolator of the cancellation circuit and a bias setting of the auxiliary amplifier of the cancellation circuit based on a look-up table that contains the power value at the output of the power amplifier of the second wireless transmitter.

15. The calibration system of claim 13, wherein the controller is further configured to:
determine a phase quadrant for the cancellation circuit; and
determine a phase setting within the phase quadrant for the cancellation circuit.

16. The calibration system of claim 13, wherein the controller is further configured to:
select a phase quadrant for the cancellation circuit that corresponds to a lowest power value at the output of the power amplifier of the second wireless transmitter; and
determine a phase setting within the phase quadrant for the cancellation circuit that corresponds to a lowest power value at the output of the power amplifier of the second wireless transmitter.

17. The calibration system of claim 13, wherein the controller is further configured to:
after the phase configuration for the phase interpolator is determined, determine a capacitor divider value for an attenuator of the cancellation circuit.

18. The calibration system of claim 13, wherein the cancellation circuit comprises:
an attenuator configured to attenuate a transmitted signal from the first wireless transmitter;
an I/Q demodulator configured to split an attenuated signal into in-phase (I) and quadrature signals (Q);
a phase interpolator configured to apply a calibration phase shift and a calibration attenuation to the I and Q signals and to recombine the I and Q signals;
an auxiliary balun coupled to an output of the phase interpolator; and
an auxiliary power amplifier with an input connected to the auxiliary balun configured to generate a cancellation signal, wherein an output of the auxiliary power amplifier is connected to an output of the second wireless transmitter.

19. The calibration system of claim 18, wherein the cancellation circuit further comprises routing lines connecting the phase interpolator to the auxiliary balun.

20. A wireless apparatus comprises:
a first wireless transmitter;
a second wireless transmitter; and
a calibration system for third order intermodulation distortion (IMD3) cancellation, the calibration system comprising:
a cancellation circuit for IMD3 cancellation between the first wireless transmitter and the second wireless transmitter; and
a controller coupled to the cancellation circuit and configured to:
for each frequency channel of the first wireless transmitter, perform a pre-conditional calibration of the cancellation circuit;
after the pre-conditional calibration, determine a phase configuration for the cancellation circuit; and
after the phase configuration for the cancellation circuit is determined, determine an attenuation configuration for the cancellation circuit.

* * * * *